(12) United States Patent
Shimizu et al.

(10) Patent No.: US 8,668,681 B2
(45) Date of Patent: Mar. 11, 2014

(54) MULTI-CHAMBER CONTAINER

(75) Inventors: Kaoru Shimizu, Shizuoka (JP); Yasuhiro Muramatsu, Shizuoka (JP)

(73) Assignee: Ajinomoto Co., Inc., Tokyo (JP)

( * ) Notice: Subject to any disclaimer, the term of this patent is extended or adjusted under 35 U.S.C. 154(b) by 791 days.

(21) Appl. No.: 12/606,384

(22) Filed: Oct. 27, 2009

(65) Prior Publication Data
US 2010/0100070 A1 Apr. 22, 2010

Related U.S. Application Data

(63) Continuation of application No. PCT/JP2008/058169, filed on Apr. 28, 2008.

(30) Foreign Application Priority Data

Apr. 27, 2007 (JP) .................................. 2007-118117

(51) Int. Cl.
*A61M 5/32* (2006.01)
(52) U.S. Cl.
USPC ........... 604/411; 604/408; 604/409; 604/410; 206/484; 206/219; 383/107; 383/109
(58) Field of Classification Search
USPC ................................................ 604/408–411
See application file for complete search history.

(56) References Cited

FOREIGN PATENT DOCUMENTS

| JP | 2003-305107 | | 10/2003 |
| JP | 2006-507914 | | 3/2006 |
| JP | 2006-087904 | * | 4/2006 |
| WO | 2004-047714 | | 6/2004 |

OTHER PUBLICATIONS

U.S. Appl. No. 12/688,427, Jan. 15, 2010, Muramatsu, et al.

* cited by examiner

*Primary Examiner* — Tatyana Zalukaeva
*Assistant Examiner* — Ilya Treyger
(74) *Attorney, Agent, or Firm* — Oblon, Spivak, McClelland, Maier & Neustadt, L.L.P.

(57) ABSTRACT

A multi-chamber container of two liquid mixing type, aiming for obtaining an increased reliability for preventing an administration from being practiced under a non separated condition of a weak seal.
The medical bag 10 has an outer peripheral strong seal 14 and a weak seal 18 for separating the space inside the medical bag into two partitions 20 and 22. At the tip end of an outlet port 12, a flap 28 as a valve member is provided, which usually closes the outlet port 12 to the space inside the medical bag. The flap 28 is connected to the opposite surface of the medical bag, so that the flap 28 is displaced in cooperation with an expansion deformation of the medical bag as obtained when the weak seal 18 is opened, resulting in opening of the outlet port 12. The flap is formed with a small hole 44 for limiting a liquid flow amount to a small value. When an infusion operation being started under the non-opened state of the weak seal, the liquid flow amount to the outlet port is restricted to a small amount by the small hole 44, thereby notifying the non-opened state of the weak seal and warning that the weak seal should be opened.

8 Claims, 7 Drawing Sheets

MULTI-CHAMBER CONTAINER

CROSS REFERENCES TO RELATED APPLICATIONS

This application is a continuation of International Patent Application No. PCT/JP2008/058169, filed on Apr. 28, 2008, and claims priority to Japanese Patent Application No. 2007-118117, filed on Apr. 27, 2007.

TECHNICAL FIELD

The present invention relates to a multi-chamber container constructed as a medical bag having a weak seal for dividing the inner cavity thereof into partitions for independently storing medicines, which weak seal is opened for causing the medicines from the respective partitions to be, first, mixed and, second, to be administered and more particularly relates to a multi-chamber container, capable of more reliably preventing such an erroneous operation from being occurred that an administration is done while the weak seal being kept under non-opened condition.

BACKGROUND TECHNOLOGY

A multi-chamber container as a medical bag made of a soft film material is itself known, which has a weak seal constructed by welding opposed surfaces of the medical bag at a relatively low temperature in a manner that the medical bag is divided into partitions for independently string different medical liquids into the respective partitions. An outlet port is made as a plastic mold product and is welded at an outer periphery of the medical bag. The outlet port is formed as a cylindrical shape and has an inner space, which has a first end opened to one of the partitions and a second end located outside the medical bag and having a rubber plug. Prior to giving the medical liquids to a patient, a pressing of the medical bag from its outside is done so that the weak seal is separated and opened, resulting in an unification of inner cavity of the medical bag, thereby mixing the two kinds of medical liquids. Therefore, a succeeding piercing of the plug by a needle of an infusion set permits the medical liquid to be desirably administered. This mixing type medical multi-chamber container necessitates that the opening of the weak seal for mixing the medical liquids is done prior to the administration. In other words, a piercing of the rubber plug of the outlet port without opening the weak seal may cause an erroneous operation to occur that only the medical liquid at the partition located adjacent the outlet port is administered. To combat this problem, a solution has heretofore been proposed that the outlet port is provided with a valve member, which cooperates with an expanded displacement of medical bag as generated when the weak seal is opened. See patent document No. 1.

As a different prior art for solving a problem that an infusion operation is possible without opening the weak seal, a solution has also been proposed that a second weak seal of slightly increased welding temperature is provided at a location upstream from the outlet port, which second weak seal is opened after the opening of the weak seal between the partitions. Refer patent documents 2 and 3.

Patent Document No. 1: Japanese Unexamined Patent Publication 2006-87904

Patent Document No. 2: Japanese Unexamined Patent Publication H09-327498

Patent Document No. 3: Japanese Unexamined Patent Publication 2006-507914

DISCLOSURE OF THE INVENTION

Problems to be Solved by the Invention

In the prior art in the Patent Document No. 1, the valve member is in its closed condition prior to the opening of the weak seal. An expanded deformation of the medical bag as caused by the opening of the weak seal allows the valve member to be released from the closed condition. The outlet port is out of communication from the inside of the medical bag under the non-opened condition of the weak seal. At the closed condition of the outlet port, any infusion is, therefore, prevented from being practiced even if a piercing of the rubber plug is done. However, in this completely closed structure of the outlet port from the medical liquids in the medical bag of the Patent Document No. 1, a sterilization operation of an inlet port during its manufacturing can be done only under a dry heated condition, resulting in a reduced sterilization efficiency. In view of this, the Patent Document No. 1 proposes to fill, separately, a liquid in the outlet port, which makes it possible to execute a sterilization operation under a wet heat condition. However, such an additional process in the structure of the Patent Document No. 1 is defective in that the production system is correspondingly complicated.

The structure of the prior art in the Patent Document No. 2 is, itself, also, difficult in an effective sterilization operation. Therefore, it is essential that a liquid is separately filled to the outlet port in a manner a sterilization under a wet heat condition is possible, which makes, however, the process to be complicated as is the case in the Patent Document No. 1. The Patent Document No. 3 discloses a structure, which is basically the same as to that of the Patent Document No. 2. However, in order to obtain an effective sterilization under a wet heat condition, the Patent Document No. 3 is additionally provided with a weak seal forming an intermediate chamber, which additional weak seal is formed with a communication passageway of a desired small size, which, on one hand, allows a passage of gas and, on the other hand, restricts a passage of liquid. As a result, a heat upon a sterilization process generates a vapor of medical liquid, which is passed through the passageway, so that a sterilization of the outlet port under a wet heat condition becomes possible.

In the valve member structure responsive to an expansion deformation as in the Patent Document No. 1, a communication passageway of reduced size may also be provided, which passageway allows a gas to pass while restricting a flow of liquid, as similar to that disclosed in the Patent Document No. 3. However, a highly sophisticated processing is needed for the creation of communication passageway, which may likely be a bottleneck in control of manufacturing process.

In view of these difficulties, the present invention aims to execute a sterilization operation under a wet heat condition and to prevent an infusion operation from being done under a non-opened condition, without generating any bottleneck in a manufacturing process.

Means for Solving the Problems

According to the present invention, a multi-chamber container is provided, which comprises: a medical bag made of a soft film and having a welded part, which welds the opposite surfaces of the medical bag in a manner that they are separable under a pressure, the welded part separating the inner cavity of the medical bag into partitions, which partitions store, respectively, medical liquids; an outlet port mounted to the medical bag; a first aperture for opening the inside of the medical bag to the inside of the outlet port for an infusion; a plug member mounted to the outlet port while facing the outside of the medical bag, said plug member being for piercing an infusion set; a valve member normally closing said first aperture to the inside of the medical bag, said valve member being responsive to an outside force for causing the first aperture of the outlet port to open, and; a second aperture for generating a liquid flow of limited amount from the inside of the medical bag to the outlet port when the valve member is situated for closing the first aperture.

Preferably, the second aperture has a flow diameter in a range of 0.1 to 0.5 mm and more preferably in a range of 0.2 to 0.3 mm or has a flow cross-sectional area corresponding to that of a flow diameter in a range of 0.1 to 0.5 mm and more preferably in a range of 0.2 to 0.3 mm.

The valve member may be constructed as a flap member, which is integrally formed in the outlet port and is opened at its single side or at its both sides. In this case, the second aperture may be a small hole formed in the flap member. According to the present invention, a method is also provided, which comprises the steps of:

providing a multi-chamber container comprising: a medical bag made of a soft film and having a welded part, which welds the opposite surfaces of the medical bag in a manner that they are separable under a pressure, the welded part separating the inner cavity of the medical bag into partitions, which partitions store, respectively, medical liquids; an outlet port mounted to the medical bag; an aperture for opening the inside of the medical bag to the inside of the outlet port for infusion; a plug member mounted to the outlet port while facing the outside of the medical bag, said plug member being for piercing an infusion set, and; a valve member normally closing said aperture to the inside of the medical bag, said valve member being responsive to an outside force for causing the aperture of the outlet port to open;

forming at the outlet port an additional aperture of an opening area smaller than that of said aperture;

piercing the plug member for creating a discharge passageway, which is in communication with the outlet port;

pumping the discharge passageway from its outside, and;

determining whether or not said welded part is opened in view of a relationship between the number of times of pumping and a discharged amount of the liquid.

Effect of the Invention

According to the present invention, a small amount of flow of the liquid via the second aperture is allowed even when the valve member is situated to close off the first aperture. A usual process when commencing an infusion process is that a needle of an infusion set is, first, pierced to a rubber plug at the bottom end of an outlet port and one-shot like finger pressing (pumping) of holder cylinder of thin walled plastic material connecting to a needle is, second, done for charging a medical liquid of an amount of a value such as 3 to 5 ml to the holder cylinder, thereby removing air from the infusion set. In the structure of the present invention, the second aperture allows a flow of medical liquid, which is however highly limited. Therefore, one shot like pumping under a non-opened condition of the weak seal can only provide a small charged amount of medical liquid, which notify the operator that the infusion operation is initiated while keeping a non-opened condition of the weal seal. In other words, the operator is reminded to execute an operation to open the weak seal, thereby preventing an erroneous operation from being practiced, which would otherwise cause the infusion operation to be continued under the non-mixed state.

EXPLANATION OF REFERENCE NUMERALS

10: Medical Bag
12: Outlet Port
14: Strong Seal
18: Weak Seal
20, 22: Partitions
26: Rubber Plug
28: Flap
42: U-shaped Opening (First Aperture of the Invention)
43: Point Seal
44: Small Hole (Second Aperture of the Invention)

BEST MODES FOR PRACTICING THE INVENTION

Figure 1:
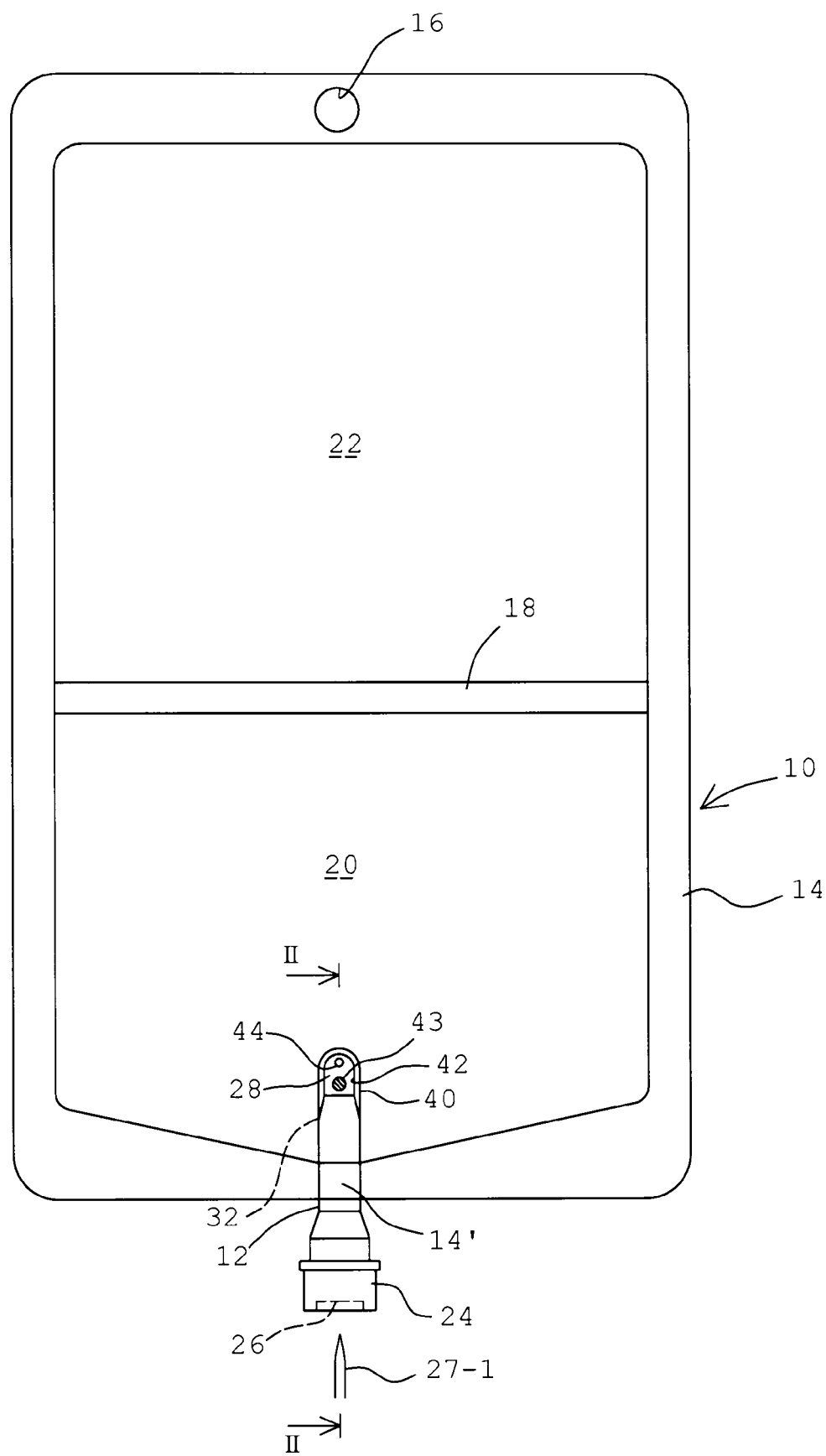
FIG. 1 is a plan view of a multi-chamber container in the first embodiment of the present invention.
Figure 2:
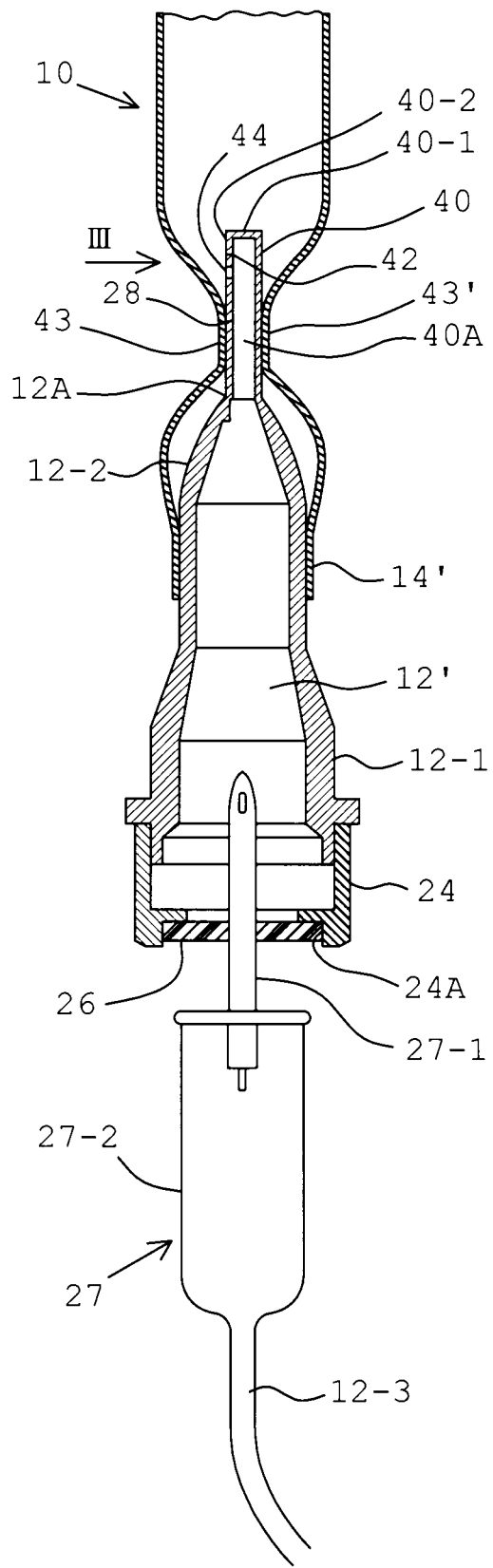
FIG. 2 is a partial cross-sectional view of the multi-chamber container taken along lines II-II in FIG. 1.

In FIGS. 1 and 2, a multi chamber container is shown, which is constructed by a flat shaped medical bag 10 and an outlet port 12. The medical bag 10 is made of a multi-layer soft film, such as a polyethylene film or polypropylene film, of a thickness of a value in a range of 200 to 400μ. In case of polyethylene film, its outer periphery is pressed at a temperature of a value such as 150° C., which is sufficiently higher than its softening temperature, so that a strong seal 14 is created, thereby obtaining a sealed structure of a generally flat shaped bag. A suspension hole 16 is formed at the top end of the strong seal 14, by which suspension hole the medical bag 10 is suspended from and supported by an infusion stand (not shown), which allows an infusion operation such as dripping or dialyzing operation to be practiced.

At a middle of the lengthwise direction, the medical bag 10 has a weak seal (separable welded portion) 18 along the entire width. This weak seal 18 thermally connects the opposed top and bottom faces of the medical bag 10, so that the space inside the medical bag 10 is divided into a first partition (cell) 20 adjacent the outlet port 12 and a second partition (cell) 22 adjacent the suspension hole 16. The first partition 20 stores therein with a first medical liquid and the second partition 22 stores therein with a second medical liquid. In order to create the weak seal 18, the top and bottom layers of polyethylene films constructing the medical bag 10 are pressed at a temperature of a value, such as 130° C., which is slightly higher than its softening temperature. When the medical bag 10 is pressed from the outside at a location of the partition 20 or 22 where the medical liquid is stored, the weak seal 18 is separated and opened while the strong seal 14 being kept as is, i.e., not being separated, so that a mixing of the first and second medical liquids occurs.

The outlet port 12 has a value of thickness to obtain a desired rigidity for keeping its shape and is formed as a mold of a plastic material, which includes polyethylene, polypropylene or polyolefin et al and which is preferably of the same type as that for constructing the medical bag 10, in order to obtain a desired adherence capability. At the location 14' of the strong seal, the welding of the top and bottom soft plastic film layers is done in a manner that the outlet port 12 is sandwiched between the film layers. As a result, a firmly connected structure of the outlet port 12 to the medical bag 10 is obtained.

Figure 4:
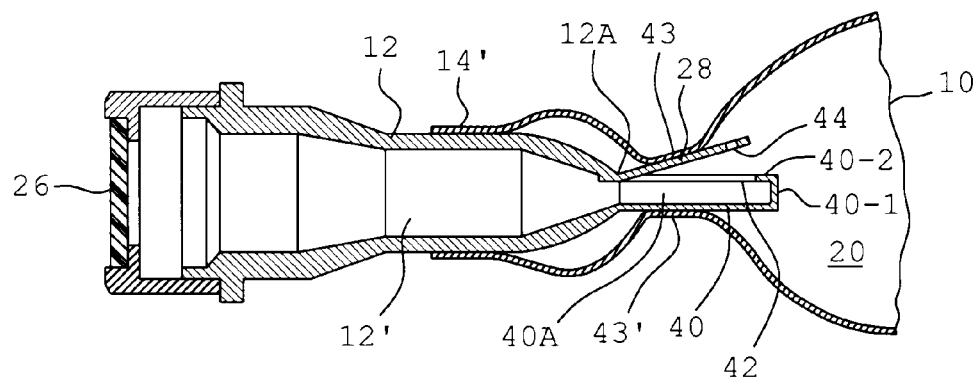
FIG. 4 is a partial view of FIG. 2, which illustrates a connecting part between the medical bag and the outlet port when the medical bag is pressed for its opening.

As shown in FIG. 2, the outlet port 12 is formed with a enlarged portion 12-1 at its first end, i.e., bottom end in the drawing, to which enlarged portion 12-1 a cap 24 is welded. As shown in FIG. 2, the cap 24 is formed with an opening 24A at its bottom wall, to which opening 24A a rubber plug 26 is fitted. As well known, an infusion set 27 is provided with a needle 27-1, which is pierced to the rubber plug 26 when an infusion operation is practiced. The outlet port 12 is formed with a throttled part 12-2 at its second end, i.e., at the top end in the drawing. The throttled part 12-2 has a substantially fixed width in the plane of the medical bag 10 as shown in FIG. 1 and, however, is tapered in the cross-sectional plane as shown in FIG. 2. The top end of the tapered portion is, at its one side, integrally formed with a flap or tab 28 as a valve member of the present invention. At the other side of the outlet port 12, a jaw portion 40 extends integrally from the tapered portion. The jaw portion 40 has a bottom wall of a profile of substantially U-shaped, from which bottom wall a U-shaped wall 40-1 is raised. From the end of the U-shaped wall 40-1 remote from the bottom wall, a lip portion 40-2 extends slightly in parallel to the bottom wall in a manner that a substantially U-shaped opening 42 as a first aperture of the present invention is formed along the inner periphery of the lip portion 40-2. Under a usual condition, the flap 28 is fitted to the U-shaped opening 42 in a manner that the flap 28 makes a close contact with the U-shaped opening 42 along the entire periphery. In short, at the location where the fitted structure is obtained, the inner passageway 12' of the outlet port 12 is completely separated from or closed with respect to the inner space of the medical bag 10, i.e., the lower partition 20. The flap 28 as an integral part of the upper tapered part of the outlet port 12 is, however, movable by a hinge 12A, which integrally connects the flap with the remaining body portion of the outlet port 12. As far as a structure of the hinge 12A of the flap 28 is concerned, the flap 28 has a desired value of thickness in a manner that an integrated hinge like movement of the flap 28 to the rest of the outlet port 12 is made possible between a closed position as shown in FIG. 2 and an opened position as shown in FIG. 4. A desired determination of a value of wall thickness of the hinge part 12A makes it possible that, once the switching to the opened position in FIG. 4 from the closed position in FIG. 2 is completed, the opened position of the flap 28 in FIG. 4 is maintained under a permanent deformation as occurred at the hinge part 12A.

Figure 3:
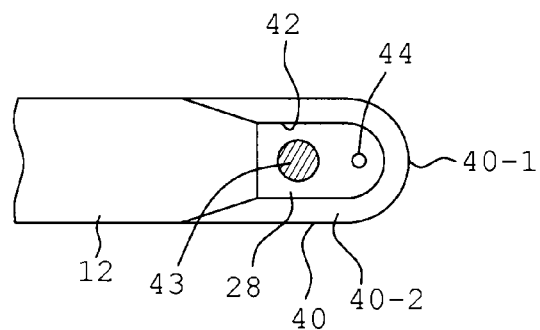
FIG. 3 is a plan view of an outlet port as a separate part from the medical bag at the tip end portion of the outlet port as viewed along a line III in FIG. 2.

As shown in FIG. 3, the flap 28 and the jaw 40 are, at their outer surfaces, firmly welded to the opposite respective inner surfaces of the plastic films constructing the medical bag 10. A reference numeral 43 denotes a portion of the plastic film welded to the flap 28 and a reference numeral 43' denotes a portion of the plastic film welded to the jaw 40. The value of the welding temperature at the portions 43 and 43' is same degree with that for obtaining the strong seal 14 and is about 150° C. in case of polyethylene. Therefore, the flap 28 moves always together with the expanded displacement or inflation of the medical bag as obtained by a separation of the weak seal 18 for mixing the medical liquids between the partitions 20 and 22. In other words, the flap 28 is prevented from being separated from the medical bag upon the expanded deformation of the medical bag, so that the flap 28 effects a rotating movement about the hinge portion 12A between the closed position shown in FIG. 2 and the opened position shown in FIG. 4. As means for welding the flap 28 to the opposed surface of the medical bag 10 at the positions 43 and 43', so-called point seal may be employed. A point seal device is provided, which includes a pair of welder members of the shape corresponding to that of the seals 43 and 43'. The welder members press the plastic film sheets constructing the medical bag to the flap 28 and the jaw 40 as are the welded portions of the outlet port 12. As a result, under a high temperature of the welder members, a point seal operation of the plastic film sheets constructing the medical bag to the flap 28 and the jaw 40 is carried out. In FIGS. 1 and 3, a shaded circular area illustrates the welded portion 43 to the flap 28 as obtained by the point seal device. Namely, at this circular area 43, the plastic film sheet constructing the medical bag is firmly welded to the flap, which allows the flap 28 to be opened under a stretching force of the plastic film sheet as obtained when the weak seal is opened.

In order to obtain a welding of the portions 43 and 43', a laser welder may be employed for obtaining heat energy. In this case, a welding device employed with a diode laser may preferably be used.

In place of a fitting structure of the flap 28 for obtaining a closure of the opening 42 by the flap 28 during the usual state, a structure may also be employed, wherein the flap 28 is integrally connected to the opening 42 by means of a thin walled portion. The thin walled portion is broken under a stretching force as obtained when the medical bag is opened, which causes the flap 28 to be turned, resulting in a formation of the opening 42. As to this possibility, refer to later explanation of FIGS. 5 and 6 with regard to the second embodiment.

As shown in FIG. 2, the flap 28 is formed with a small hole 44 as a second aperture according to the present invention at a location away from the welded portion 43 and facing the partition 20. The small hole 44 functions to communicate always the inside of the medical bag, i.e., the lower partition 20 with the inner passageway 12' of the outlet port 12, so that the medical liquid inside the medical bag is flown into the inlet port 12 at a rate, which is determined by a flow diameter of the small opening 44. The value of the diameter of the small opening 44 is such that only a small amount of flow from the lower partition 20 is allowed under a closed state of the flap 28, i.e., under a non-opened state of the weak seal 8, which amount is too small, so that the operator who is preparing an infusion operation is warned that the weak seal 18 is not yet opened, i.e., a separation of the weak seal 18 is not yet done. Now, a result of test conducted by the inventor as to the optimum value of the flow diameter of the small hole 44 will be explained. In FIG. 2, the infusion set 27 is of type 500 and the needle 27-1 is directly pierced to the rubber plug 26. This type 500 infusion set is the one that the needle 27-1 directly extends to the dripping cylinder 27-2, from which the infusion pipe 27-3 extends. Prior to the commencement of an infusion operation, one cycle or one shot pumping operation of the dripping cylinder 27-2 is essentially required in order to discharge residual air, wherein the dripping cylinder 27-2 is pressed once by the operator's fingers and, then, is released so that an amount of medical liquid in the medical bag is sucked into the dripping cylinder 27-2. In a conventional structure of the medical bag, the inlet port has an inner passageway of an opening diameter of a substantially constant value of, for example, 10 mm, which is always in communication with the space inside the medical bag, so that one cycle pumping would be enough for charging a desired amount of medical liquid to a dripping cylinder. Contrary to this, in the structure of the medical bag 10 of the present invention shown in FIG. 2, the flap 28 closes the outlet port 12 under the non-opened condition and the partition 20 is in communication with the inner passageway 12' of the outlet port 12 via only by small hole 44. Therefore, one cycle pumping highly limits the value of charged amount of medical liquid sucked into the dripping cylinder 27-2 and, furthermore, even repetition of pumping is difficult to obtain the desired charged amount, which will notify to or remind the operator that a piercing by the infusion set is done without opening the weak seal 18.

As to type 500 infusion set shown in FIG. 2 as well type 216D infusion set, numbers of times of pumping for obtaining a discharged amount of 150 ml of water were tested, while the maximum value of times of pumping was limited to 20 and while the diameter of the small hole was varied between three values, that were 0.1 mm, 0.2 mm and 0.3 mm. The result of test is shown in the following Table I in comparison with the one as obtained by a conventional type outlet port. Note: the type 216D infusion set is similar to infusion set of type 500 except that a tube of a predetermined length is arranged between the needle 27-1 and the dripping cylinder 27-2. Furthermore, the conventional type outlet port implies the one that has an inlet passageway 12' opened directly to the partition (cell) and of substantially unchanged inner diameter.

TABLE I

| Hole Diameter (mm) | Type 500 | Type 216D |
|---|---|---|
| 0.1 | 20 times*[1] | 20 times*[2] |
| 0.2 | 20 times*[3] | 9 times |
| 0.3 | 19 times | 6 times |
| Existing Type | 1 time | 1 time |

*[1]-*[3]Since the number of times of pumping was limited to 20, a discharge of the desired amount could not be obtained. This means that a number of times larger than 20 will be needed for discharging the desired amount.

As to type 216D infusion set, numbers of times of pumping for discharging a PTW (Pn-TWin) No. 3 glucose-electrolyte of values of amount of 200 ml and 800 mm, respectively were tested, while the diameter of the small hole was varied between three values, that were 0.2 mm, 0.3 mm and 0.5 mm. A result of the test is shown in the following table II.

TABLE II

| Hole Diameter (mm) | 200 mL | 800 mL |
|---|---|---|
| 0.2 | 7 times | 8 times |
| 0.3 | 4 times | 4 times |
| 0.5 | 5 times | 2 times |
| Existing Type | 1 time | 1 time |

As will be clearly shown by the above results, a hole diameter of value of 0.5 mm can provide a value of number of pumping times larger than that of the existing type and is effective to obtain a reminding function that an infusion is done under the non-opened condition. A value of diameter of the small hole 44 smaller that 0.3 mm is more preferable for obtaining a more reliable warning function since a significantly increased value of the number of pumping times is obtained. On the other hand, the finest hole diameter for a passage of liquid flow is 0.1 mm, which, however, makes the machining to be less effective and therefore a value of hole diameter of 0.2 mm is desirable as a lower limit value. In short, a desired range of the diameter is 0.1 to 0.5 mm and more preferably 0.2 to 0.3 mm. It is usual that the small hole 44 is of circular shape. The present invention may, however, be practiced by a shape other than circular shape, such as elliptical shape or oblong shape or even rectangular shape and, in this latter case, the small hole 44 must have a value of cross sectional area corresponding the that of the hole of diameter in a range of 0.1 to 0.5 mm and, more preferably, of 0.2 to 0.3 mm.

A sterilization operation of the medical bag according to the present invention will now be explained. The sterilization is done by heating at a predetermined temperature under a condition that medical liquids are charged into the cells 20 and 22, respectively, the cells 20 and 22 are tightly closed by the strong seal 14 and the outlet port 12 is mounted to the strong seal 14 under a tightly closed condition. A vapor of medical liquid is generated in the lower cell 20 and is freely introduced into the inner passageway 12' of the outlet port 12 by way of the fine hole 44 formed in the flap 28 for vapor passage and of a diameter smaller than the minimum diameter for liquid passage. Therefore, the vapor of the medical liquid is filled in the lower cell 22, thereby permitting the space inside the outlet port to be subjected to the sterilization under a wet heat condition.

An infusion operation by using the medical bag according to the present invention will, now, be explained. In the usual state, non-opened condition of the weak seal, the flap 28 welded to the opposed inner surface of the medical bag 10 positions as shown in FIG. 2 and is fitted to the jaw 40 in a liquid tight manner, so that the inner passageway 12' of the outlet port 12 is closed with respect to the inner space of the medical bag 10. When a needle 27-1 of an infusion set is pierced to the rubber plug 26, a flow of medicine is allowed via the small hole 44, but is highly limited. Therefore, even when a pumping is done, a desired sufficient amount of medical liquid can not be sucked, thereby warning that the weak seal is not yet opened.

In order to make the weak seal 18 to open, the medical bag 10 is rested on a desk et al under a flattened condition, and, then, pressed by palms. Namely, the pressure of the medical liquid as generated by the pressing causes the layers of the medical bag 10 to be separated at the weak seal 18, thereby communicating the partitions 20 and 22 with each other. As a result, the medical liquids precedingly separately stored in the respective partitions 20 and 22 are now mixed. Upon the opening of the weak seal 18, the medical bag 10 is subjected to an expansion deformation as shown in FIG. 4 at a location where the medical bag 10 is connected to the outlet port 12. As a result, the flap 28 firmly connected to the opposite surface of the bag by the point seal 43 cooperates with the expanded displacement of the medical bag to generate an outside force, which urges the flap 28 to open, so that the flap 28 turns about the hinge 12A. Thus, the flap 28 is finally separated from the jaw 40, while maintaining the firmly adhered condition of the flap 28 with respect to the opposite surface of the medical bag 10. Due to the turning movement of the flap 28, the U-shaped opening 42 connected to the inside of the medical bag is opened, so that one cycle pumping of the dripping cylinder 27-2 by fingers is enough to suck a desired amount of mixed medical liquid into the dripping cylinder 27-2, which notifies that an infusion operation can be instantly started.

Figure 5:
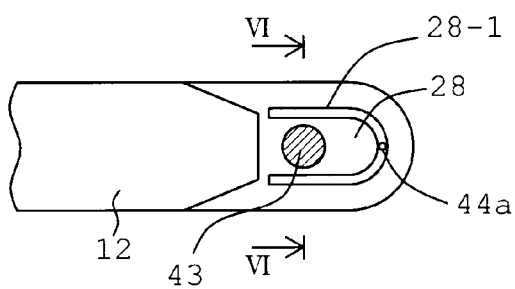
FIG. 5 is a plan view of an outlet port at its tip end portion as modified in that a small hole is formed in an integral thin walled portion connecting a flap with a jaw.
Figure 6:
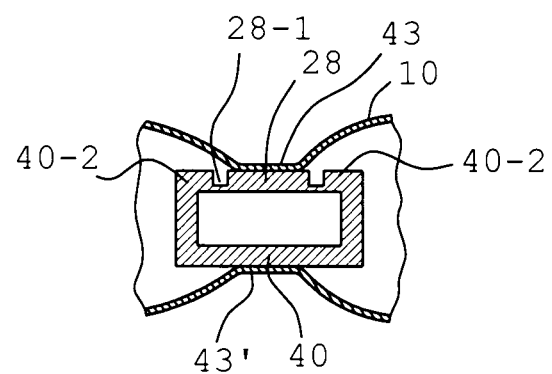
FIG. 6 is a view taken along lines VI-VI in FIG. 5.

FIGS. 5 and 6 illustrates, also, an embodiment where the flap 28 is connected to the lip portion 40-2 of the jaw 40 by means of the integrally formed thin wall portion 28-1 but modified in that a small hole 44*a* as a second aperture of the modified structure is formed in this thin walled portion 28-1 adjacent the tip end of the outlet port 12. The synthetic resin films constructing the medical bag are, at their inner surfaces, welded to the opposite outer surfaces of the flap 28 and jaw 40 by means of point seals 43 and 43'.

In the modification in FIGS. 5 and 6, the flap 28 is integrally formed with respect to the jaw 40 by means of the thin walled portion 28-1 and the inside of the medical bag is in communication with the inner passage of the outlet port 12 only through the small hole 44*a*. As a result, even if an infusion were tried without the opening the weak seal, only a very limited liquid flow amount can be obtained, which reminds and notifies the operator that an erroneous operation is done. Contrary to this, when the opening of the medical bag is done, the flap 28 is turned outwardly by a stretching force as generated in the synthetic resin film, which causes the thin walled portion 28-1 to be broken, thereby opening the jaw 40. The breakage of the thin walled portion 28-1 can be started very reliably at the fine hole 44*a* as the most weak portion in the thin wall portion 28-1 and is progressed smoothly along the thin wall portion 28-1.

Figure 7:
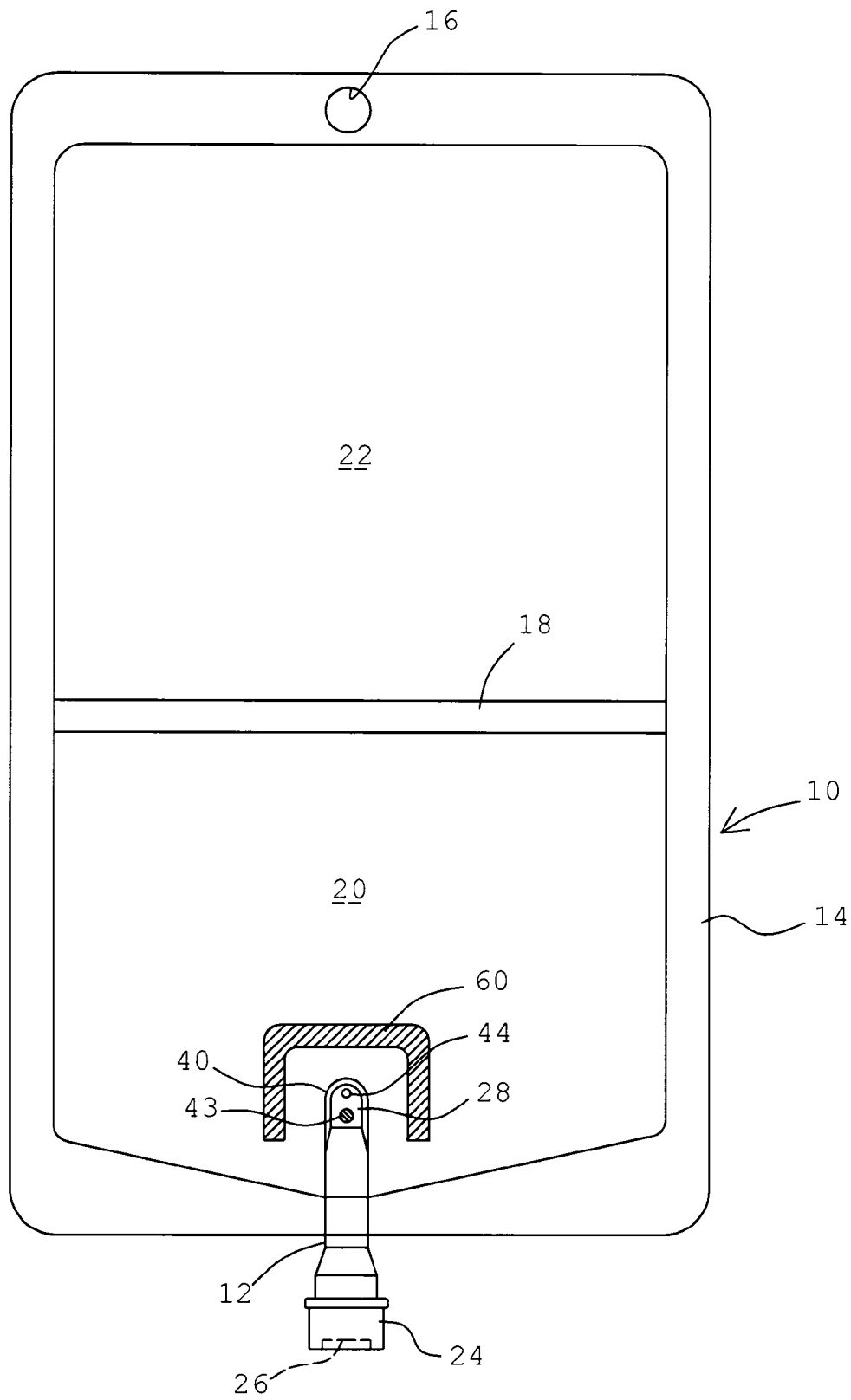
FIG. 7 is a plan view of a multi-chamber container in another embodiment of the present invention.

FIG. 7 illustrates another embodiment, which includes an additional separable weld 60 located adjacent the end of the outlet port inside the medical bag and of a generally C shape 10 opened to the outlet port end. The outlet port 12 has a construction similar as that of the first embodiment, i.e., has a flap 28 as a valve member, which is of non-separably and firmly welded to the opposite surface of the medical bag 10 by means of a point seal 43. The additional separable weld 60 connects separably the opposite top and bottom layers of the medical bag under the pressure and the welding temperature is of the similar degree as or slightly larger than that for obtaining the weak seal 18 between the cells 20 and 22.

The medical liquids stored in the medical bag may sometimes be subjected to a slight pressing during its handling such as a transportation, which causes the medical bag to be more or less inflated. The additional separable weld 60 functions to restrict a direct transmission of the inflation to the point seal 43 as a welding point of the medical bag to the flap 28, which is effective for preventing the flap 28 from being non-intentionally opened.

When a pressing of the medical bag is done at a location where the medical liquid is stored, an inflated deformation of the bag 10 is generated and is transmitted to the weak seal 18 between the partitions as well as to the additional separable weld 60, so that they are separated. In addition, in cooperation with the inflated deformation of the medical bag at a location adjacent the outlet port, the flap 28 is displaced and separated from the jaw 40, which permits the mixed liquids to be flown into the outlet port.

In case where a piercing of an infusion set is done without opening the weak seal 18, the outlet port 12 communicates with the space inside the medical bag only through a small hole 44 in the flap 28. As a result, one cycle pumping of the infusion set by operator's fingers allows a only very limited flow, so that a small amount of filled liquid can only be obtained in the infusion set, which amount is quite short of the desired level. As a result, the operator is warned that a necessary opening operation of the weak seal 18 is not yet done, i.e., he or she is reminded to open the weak seal 18.

Figure 8A:
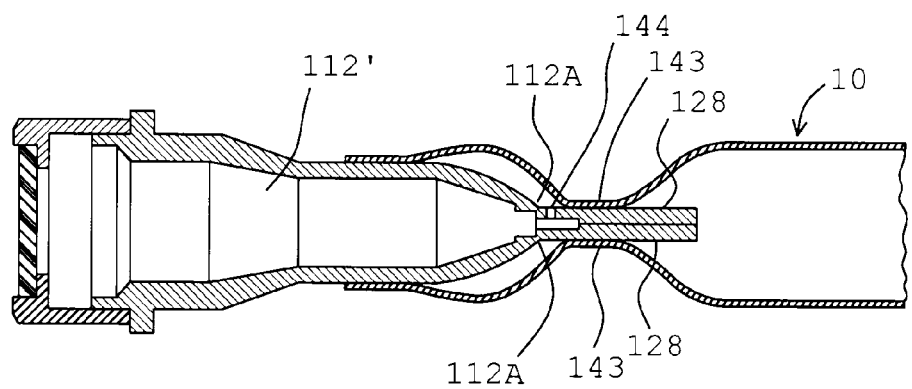
FIGS. 8(a) and 8(b) are, respectively, longitudinal cross-sectional views of a multi-chamber container in further another embodiment of the present invention, illustrating closed and opened conditions, respectively.
Figure 8B:
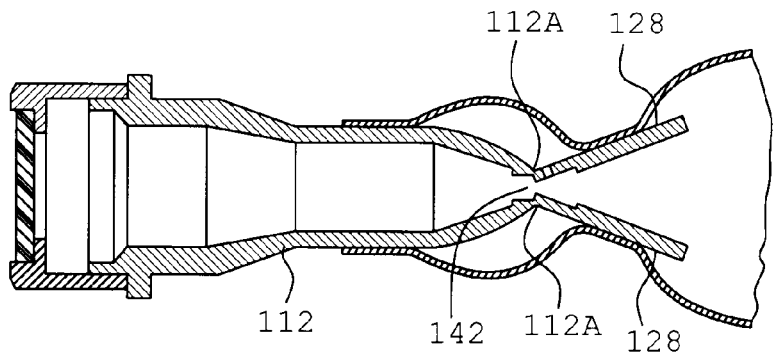
Figure 9:
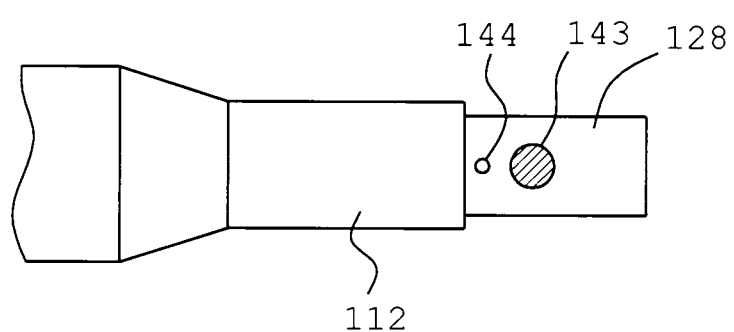
FIG. 9 is a plan view of an outlet port at its tip end portion in the embodiment in FIG. 8.

FIGS. 8 and 9 illustrate further another embodiment, including a pair of flaps 128, which is, unlike the single sided flap 28 in the first embodiment, opened on both sides. Namely, each of the flaps 128 is connected to a tip end of an outlet port 112 by an integral hinge 112A. Plastic film cuts constructing a medical bag 10 are welded to opposite surfaces of the flaps 128, respectively by means of top and bottom opposite pint seals 143. At a location on one side of one of the flaps 128 spaced from the corresponding point seal 143, a small hole 144 as the second aperture of the present invention is formed. As similar to the first embodiment, the small hole 144 permits only a limited amount of medical liquid flow, which is too small so that an operator for an infusion is notified or reminded that the weak seal is not yet opened. As similar to the preceding embodiment, the small hole has a diameter in a range of 0.1 to 0.5 mm, more preferably in a range of 0.2 to 0.3 mm or has a flow cross-sectional area corresponding to that of a flow diameter in a range of 0.1 to 0.5 mm, more preferably in a range of 0.2 to 0.3 mm.

During the usual state, the flaps 128 are in fluid tight contact with the opposed surface as shown in FIG. 8(*a*), so that the inner passageway 112' of the outlet port 112 is in communication with the inside of the medical bag 10 only through the small hole 144. As a result, a small amount of the medical liquid inside the medical bag can only be flown into the outlet port 112. Such a small amount of flow is effective for notifying an operator that the medical bag is not yet opened.

When the medical bag 10 is opened, the resultant stretching force in the synthetic resin films constructing the medical bag causes the flaps 128 to be outwardly rotated at the respective hinges 112A as shown in FIG. 8(*b*). Furthermore, a permanent deformation of the hinges 112A is obtained by a desired adjustment of a wall thickness et al, so that the flaps 128 maintain the opened positions as shown in FIG. 8(*b*), thereby obtaining an opening 142 as the first aperture of the present invention. It will be clear that the opening 142 can maintain the desired flow amount of the medical liquids, which is necessary to practicing a desired infusion operation.

In this embodiment of the double hinged structure, a construction may be employed that top and bottom flaps 128 are connected with each other by means of a thin wall portion, which is broken by an outside force in order to obtain a communication between the medical bag and the outlet port.

As described above, in the present invention, a provision is made as to an opening means (second aperture of the invention), which permits a small amount of liquid flow under a closed condition of the outlet port. Thus, an operator is notified that an infusion process is commenced under a non-opened condition of weak seal and is reminded to make the weak seal to open, thereby preventing an erroneous operation, which would otherwise cause an infusion operation to be continued without opening the weak seal is continued. Furthermore, the space inside the medical bag is under always communication with the inlet port, so that a heating for an sterilization allows a medical liquid vapor to be flown into the outlet port, resulting in an execution of the sterilization under wet heat condition, thereby obtaining an increased sterilization efficiency.

The invention claimed is:

1. A multi-chamber container comprising: a medical bag made of a soft film and having a welded part, which welds the opposite surfaces of the medical bag in a manner that they are separable under a pressure, the welded part separating the inner cavity of the medical bag into partitions, which partitions store, respectively, medical liquids; an outlet port mounted to the medical bag; a first aperture for opening the inside of the medical bag to the inside of the outlet port for an infusion; a plug member mounted to the outlet port while facing the outside of the medical bag, said plug member being for piercing an infusion set; a valve member normally closing said first aperture to the inside of the medical bag, said valve member being responsive to an outside force for causing the first aperture of the outlet port to open, and; a second aperture for generating a liquid flow of limited amount from the inside of the medical bag to the outlet port when the valve member is situated for closing the first aperture, wherein said second aperture is integrally formed on said outlet port.

2. A multi-chamber container according to claim 1, wherein said opening of said valve member is done by a stretching force in the soft film constructing the medical bag as obtained when the latter is opened.

3. A multi-chamber container according to claim 1, wherein said second aperture has a flow diameter in a range of 0.1 to 0.5 mm, more preferably in a range of 0.2 to 0.3 mm or has a flow cross-sectional area corresponding to that of a flow diameter in a range of 0.1 to 0.5 mm, more preferably in a range of 0.2 to 0.3 mm.

4. A multi-chamber container according to claim 1, wherein said valve member is constructed as a flap member, which is integrally formed with the outlet port and is opened on its single side or on its both sides.

5. A multi-chamber container according to claim 4, wherein said second aperture is subsequently formed in said flap member by a later processing.

6. A multi-chamber container according to claim 1, wherein it further comprises an additional welded portion, which welds opposite surfaces of the medical bag at location adjacent the outlet port, while leaving partially non-welded portion as a medical liquid passageway to the outlet port, said additional welded portion being separable under a pressure.

7. A multi-chamber container according to claim 4, wherein said flap member has a thin walled part connected to the rest of the outlet port, said thin walled part being breakable by an outer force.

8. A multi-chamber container according to claim 1, wherein said second aperture is located at said thin walled part.

\* \* \* \* \*